Feb. 15, 1927.

H. E. S. HOLT 1,618,009

PARACHUTE APPARATUS

Filed Feb. 4, 1926      2 Sheets-Sheet 1

Inventor.
Harold Edward Sherwin Holt
By
B. Singer, Atty.

Feb. 15, 1927. 1,618,009
H. E. S. HOLT
PARACHUTE APPARATUS
Filed Feb. 4, 1926   2 Sheets-Sheet 2
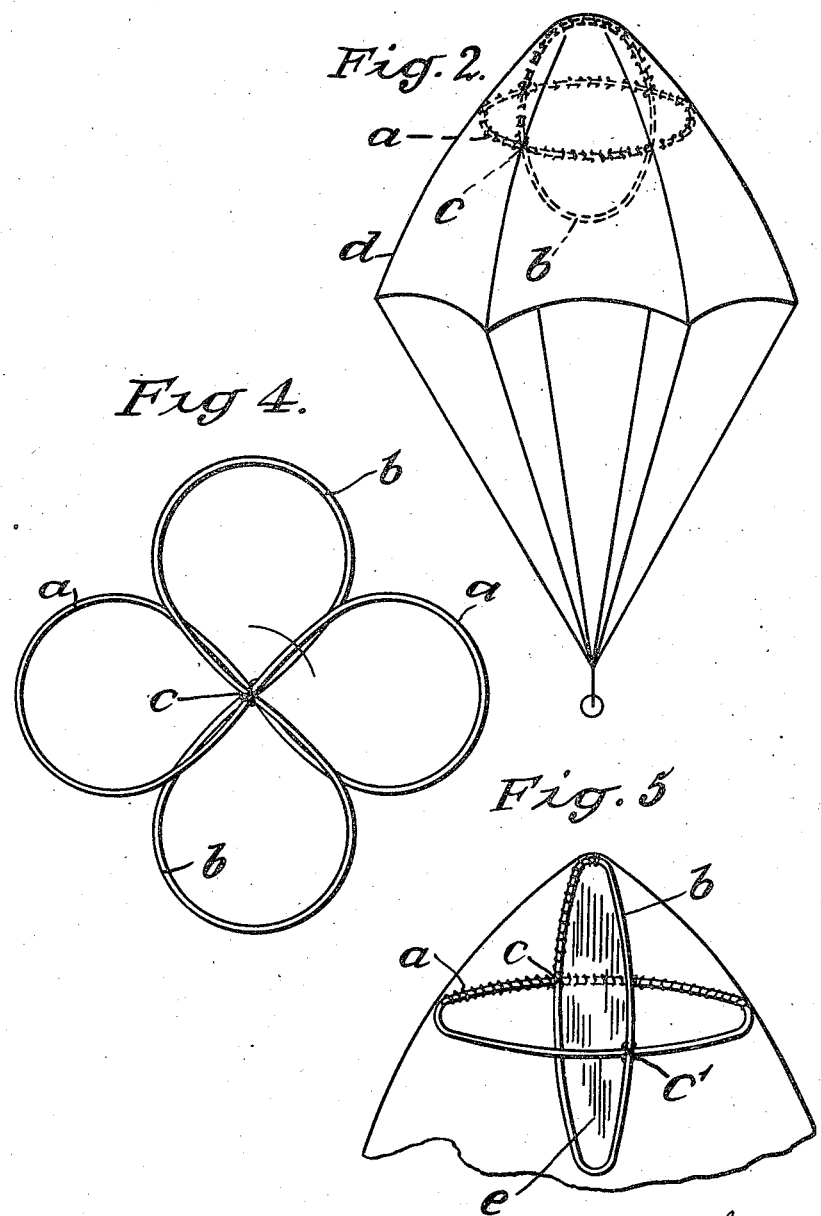

Patented Feb. 15, 1927.

1,618,009

UNITED STATES PATENT OFFICE.

HAROLD EDWARD SHERWIN HOLT, OF LONDON, ENGLAND.

PARACHUTE APPARATUS.

Application filed February 4, 1926, Serial No. 86,038, and in Great Britain March 28, 1925.

This invention provides improved spring means for assisting the opening of a parachute or ensuring that the fabric forming the supporting surface shall be unfolded and distended or become operative when the parachute is launched.

The invention is applicable to folding parachute apparatus in general but more especially to parachute apparatus comprising a pilot parachute and one or more load supporting parachutes and an envelope, case or container in which the parachutes are carried in a folded or compacted condition, said case being capable of attachment to the person of the aeronaut by a suitable harness.

My invention has for its object to ensure the opening of the pilot parachute when the apparatus is launched and the cover flap of the case or container is released, and is characterized by the use of spring means in the form of one or more resilient rings or hoops attached to the parachute fabric in such manner that the spring ring or rings can each be folded in the shape of a figure 8 as hereinafter described, but being under tension will only remain folded so long as they are restrained by, for example, the cover of the parachute case or container.

A preferred form of construction comprises two resilient rings or hoops secured or connected together in planes at right angles intersecting upon a diameter common to both rings, the rings or hoops being attached to the fabric of the parachute on the inside by stitching for example. One ring extends around the fabric of the parachute at a suitable distance below the crown or top and is held in concentric relation thereto by the stitches, whilst the other ring or to be exact an upper segment thereof fits against and is stitched into the crown or top of the parachute the other part of the ring being left free. The last mentioned ring is covered with a diaphragm of silk or other material to prevent the fabric or the lines of the parachute from being caught therein.

In the accompanying sheet of illustrated drawings:

Figure 2 is a diagram of a parachute showing the spring rings attached thereto by stitching.

Figures 3 and 4 are detail views showing the spring rings partly and completely folded for packing and Figure 5 is a sectional elevation of the crown of the parachute taken at right angles to Figure 1.

Figure 1:
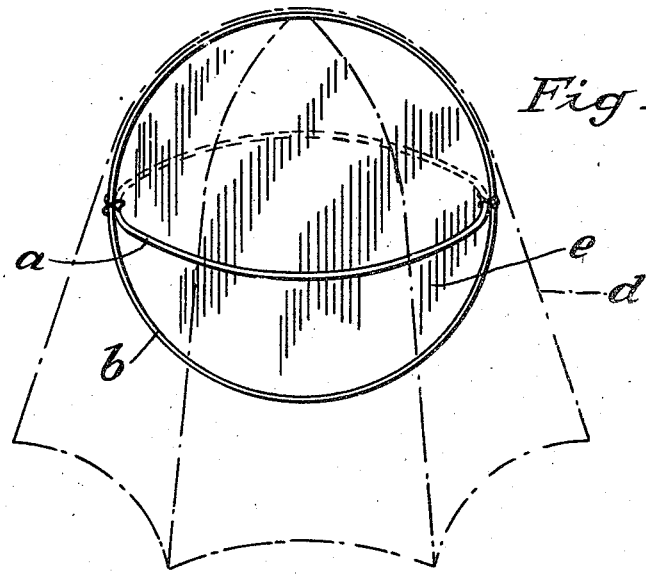
Figure 1 is an elevation of a parachute spring formed of two resilient rings in accordance with this invention, the parachute fabric being indicated conventionally by broken lines.

Referring to the drawings the two spring rings or hoops $a$, $b$ are made of steel or other suitable material and connected together at right angles at $c$, $c'$ as for example by being brazed, or by being lashed with wire and soldered, or by the application of sheet metal jointing lugs or by any other suitable means. It will also be evident that instead of joining together two separate rings, the two spring rings could be formed from a single continuous length of wire. As shown the ring $a$ is stitched all around to the parachute fabric $d$, but the ring $b$ is in part attached by stitching to the crown of the parachute and in part freely suspended therein and covered with a diaphragm $e$ for the purpose described.

Figure 3:
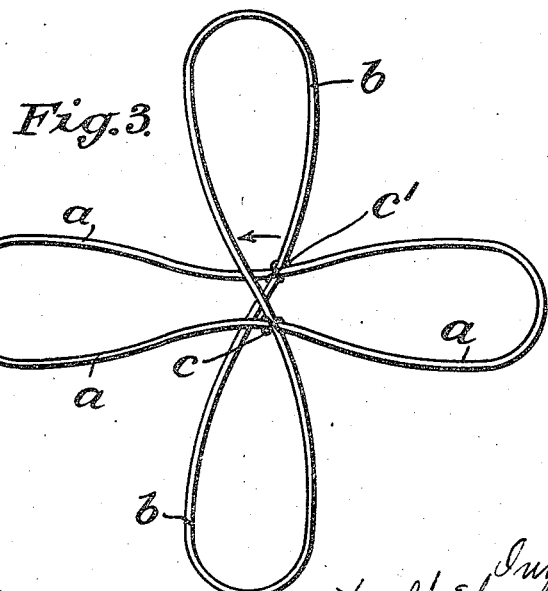

By applying pressure with a slight twisting action to the diametrically opposed points where the rings or hoops cross one another and are connected together at right angles, each ring can be caused to take the shape of a figure 8 as shown in Figures 3 and 4 and the four loops thus formed by the two rings will pack substantially flat inside the parachute when the same is folded, but will only remain in that form so long as they are held or restrained, and will resume their circular shape immediately on being released.

When packing the parachute the main parachute is put in the case first and a flap is then folded over the main parachute and separates the pilot parachute therefrom which with its springs pressed substantially flat is placed in position last immediately under the cover flap or flaps.

In some cases a single spring ring may be employed and attached to the parachute after the manner of the ring $a$ but this is not so strong or effective as the two rings at right angles.

I claim—

1. An improved spring means for assisting the opening of a parachute spring means being directly attached to the crown of the parachute fabric and capable of being folded in the form of a figure 8 and put under tension when the parachute is folded.

2. An improved spring for assisting the opening of a parachute comprising two springs rings or hoops secured or connected together at right angles and attached to the inside of the parachute as described, each ring being capable of folding in the form of a figure 8.

3. An improved spring for assisting the opening of a parachute according to claim 2 wherein one of the spring rings is provided with a diaphragm for the purpose described.

4. In a parachute, means for assisting the opening of the parachute comprising a spring ring or hoop secured to the fabric of the parachute, on the inside thereof, in concentric relation to the crown of the parachute and a second spring ring or hoop connected to the first at right angles and secured by its upper segment to the crown of the parachute.

5. In a parachute, means for assisting the opening of the parachute comprising a spring ring or hoop secured to the fabric of the parachute, on the inside thereof, in concentric relation to the crown of the parachute, a second spring ring or hoop connected to the first at right angles and secured by its upper segment to the crown of the parachute, and a diaphragm stretched over the second spring ring or hoop for the purpose described.

In testimony whereof he has affixed his signature.

HAROLD EDWARD SHERWIN HOLT.